United States Patent
Liao

(10) Patent No.: US 8,255,728 B2
(45) Date of Patent: Aug. 28, 2012

(54) SYSTEM COMPRISING A PLURALITY OF POWER SUPPLY CIRCUITS EACH WITH A DIFFERENT TURN-ON DELAY FOR PROVIDING A PLURALITY OF VOLTAGES TO A RESPECTIVE PERIPHERAL DEVICE INTERFACE

(75) Inventor: Yi-Lan Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 370 days.

(21) Appl. No.: 12/760,460

(22) Filed: Apr. 14, 2010

(65) Prior Publication Data
US 2011/0246794 A1    Oct. 6, 2011

(30) Foreign Application Priority Data
Apr. 1, 2010    (TW) .............................. 99110227 A

(51) Int. Cl.
*G06F 1/00* (2006.01)
(52) U.S. Cl. ...................................... 713/330; 713/300
(58) Field of Classification Search .................. 713/300, 713/330
See application file for complete search history.

(56) References Cited

U.S. PATENT DOCUMENTS

| | | | | |
|---|---|---|---|---|
| 5,414,863 A * | 5/1995 | Lee et al. | ....................... | 713/330 |
| 6,668,305 B1 * | 12/2003 | Henriquez | ..................... | 711/112 |
| 7,278,036 B2 * | 10/2007 | Yuan | .............................. | 713/300 |
| 7,305,572 B1 * | 12/2007 | Burroughs et al. | ........... | 713/300 |
| 7,584,368 B2 * | 9/2009 | Nichols et al. | ................ | 713/300 |
| 7,975,158 B2 * | 7/2011 | Elgousi et al. | ................ | 713/330 |
| 8,166,331 B2 * | 4/2012 | Zou | ................................ | 713/330 |
| 2002/0026595 A1 * | 2/2002 | Saitou et al. | ................. | 713/300 |
| 2004/0181699 A1 * | 9/2004 | Katoh et al. | .................. | 713/300 |
| 2006/0143488 A1 * | 6/2006 | Peleg et al. | ................... | 713/330 |
| 2007/0226523 A1 * | 9/2007 | Chang | ........................... | 713/300 |

* cited by examiner

Primary Examiner — Mark Connolly
(74) Attorney, Agent, or Firm — Altis Law Group, Inc.

(57) ABSTRACT

A computer motherboard includes a number of peripheral device interfaces, first and second voltage output terminals, and a number of power supply circuits corresponding to the S peripheral device interfaces. Each peripheral device interface includes a first power pin and a second power pin. Each power supply circuit includes a delay circuit, and first to third electronic switches. The delay circuit controls the first electronic switch to be turned on after a delay time. The delay times of the power supply circuits are different. The second and third electronic switches are turned on in response to the first electronic switch being turned on. The first voltage output terminal is connected to the first power pin through the second electronic switch. The second voltage output terminal is connected to the second power pin through the third electronic switch.

12 Claims, 1 Drawing Sheet

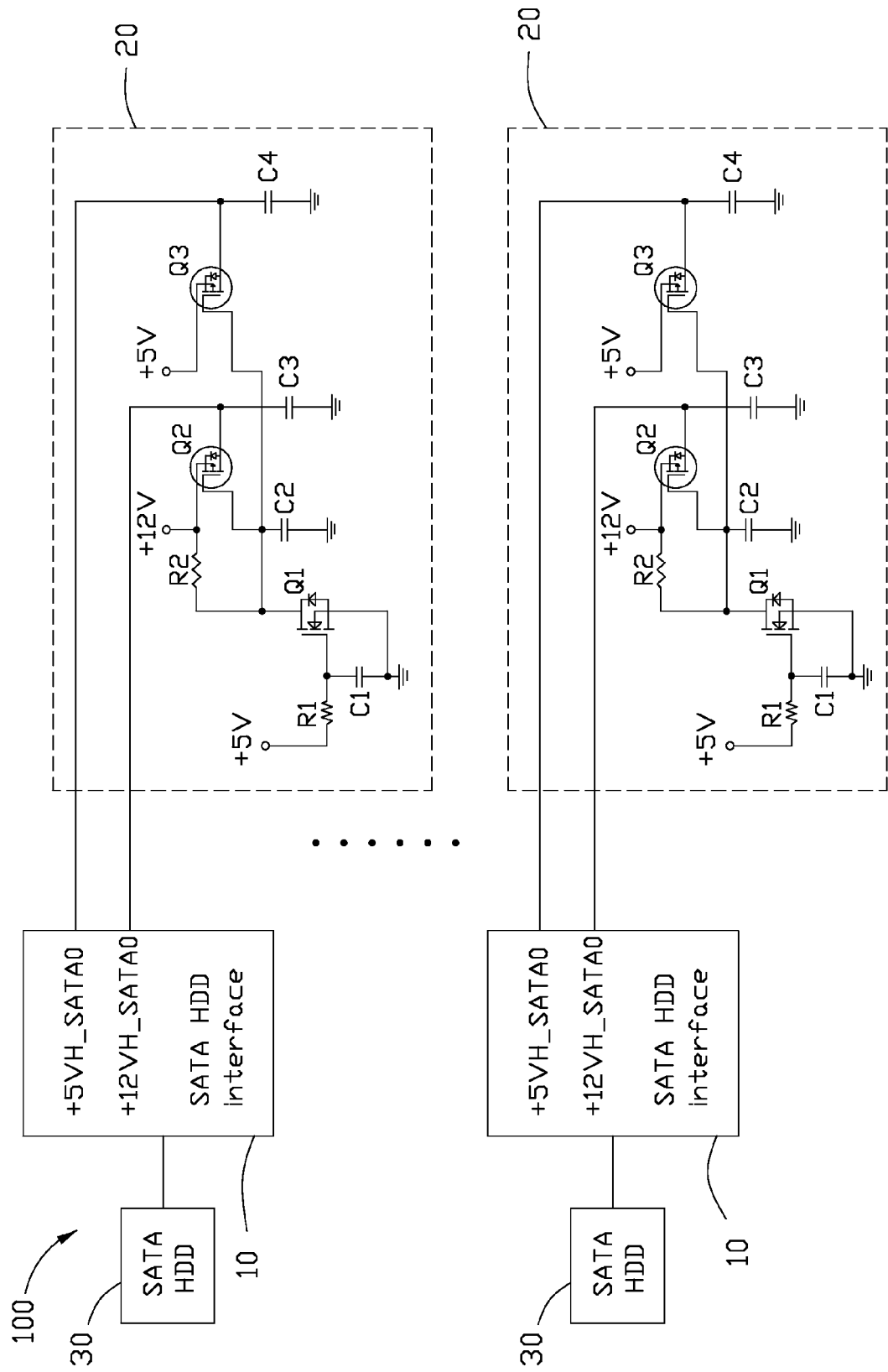

SYSTEM COMPRISING A PLURALITY OF POWER SUPPLY CIRCUITS EACH WITH A DIFFERENT TURN-ON DELAY FOR PROVIDING A PLURALITY OF VOLTAGES TO A RESPECTIVE PERIPHERAL DEVICE INTERFACE

BACKGROUND

1. Technical Field

The present disclosure relates to computer motherboards, and particularly, to a power supply circuit of a computer motherboard.

2. Description of Related Art

Serial Advanced Technology Attachment (SATA) hard disk drives (HDDs) are mass storage devices that are attached to the motherboards of electronic devices, such as computers. More than one SATA HDDs may be attached to the computer motherboard. When the computer motherboard is turned on, all the SATA HDDs may draw current at the same time and this may shut the motherboard down or may damage the motherboard. A common method to deal with the above problem is to add a microprocessor connected between a power supply circuit and the SATA HDDs, and the microprocessor controls the power supply circuit to supply power to the SATA HDDs at different times. However, the microprocessor is very expensive.

BRIEF DESCRIPTION OF THE DRAWING

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The drawing is a circuit diagram of a computer motherboard.

DETAILED DESCRIPTION

The disclosure is illustrated by way of example and not by way of limitation in the figures of the accompanying drawing in which like references indicate similar elements. It should be noted that references to "an" or "one" embodiment in this disclosure are not necessarily to the same embodiment, and such references mean at least one.

Referring to the drawing, an embodiment of a computer motherboard 100 includes a plurality of peripheral device interfaces such as Serial Advanced Technology Attachment (SATA) hard disk drive (HDD) interfaces 10 for connecting a plurality of peripheral devices such as SATA HDDs 30, and a plurality of power supply circuits 20 correspondingly connected to the plurality of SATA HDD interfaces 10.

Each power supply circuit 20 includes two resistors R1 and R2, four capacitors C1-C4, a first electronic switch such as an n-channel metal oxide semiconductor (NMOS) field-effect transistor (FET) Q1, a second electronic switch such as a p-channel metal oxide semiconductor (PMOS) FET Q2, and a third electronic switch such as a PMOSFET Q3. Each SATA HDD interface 10 includes a first power pin +5VH_SATA0 and a second power pin +12VH_SATA0, respectively to receive two voltage signals, such as a 5 volt (V) voltage and a 12V voltage, from the corresponding supply circuit 20, and to provide the two voltage signals to the corresponding SATA HDD 30.

A first terminal of the resistor R1 is connected to a first voltage output terminal, such as a +5V voltage output terminal of the computer mother board 100. A second terminal of the resistor R1 is grounded through the capacitor C1. A delay circuit is composed of the resistor R1 and the capacitor C1, and a delay time is determined by the resistance of the resistor R1 and the capacitance of the capacitor C1. Delay times of the supply circuits 20 are different from each other.

A gate of the FET Q1 is connected to a node between the resistor R1 and the capacitor C1. A source of the FET Q1 is grounded. A drain of the FET Q1 is connected to a second voltage output terminal, such as a +12V voltage output terminal, of the computer mother board 100 and a source of the FET Q2 through the resistor R2. The drain of the FET Q1 is also connected to gates of the FETs Q2 and Q3, and grounded through the capacitor C2. A drain of the FET Q2 is connected to the second power pin +12VH_SATA0 of the corresponding SATA HDD interface 10, and grounded through the capacitor C3. A source of the FET Q3 is connected to the first voltage output terminal of the computer motherboard 10. A drain of the FET Q3 is connected to the first power pin +5VH_SATA0 of the corresponding SATA HDD interface 10, and grounded through the capacitor C4.

In use, for example, the plurality of SATA HDD interfaces 10 includes first to fourth SATA HDD interfaces 10, the plurality of supply circuits 20 includes first to fourth supply circuits 20, and the break-on voltage of the FET Q1 of each of the first to fourth supply circuits 20 is 0.8V. The relationship of the delay time of each supply circuit 20, the resistance of the resistor R1, and the capacitance of the capacitor C1 are listed in the table below. The delay time is the time from the start of the computer motherboard 100 to the voltage of the gate of the FET Q1 reaching 0.8V.

|  | R1 | C1 | delay time |
| --- | --- | --- | --- |
| First power supply circuit 20 | 10 KΩ | 0.1 μF | 147 μS |
| Second power supply circuit 20 | 20 KΩ | 0.1 μF | 349 μS |
| Third power supply circuit 20 | 30 KΩ | 0.1 μF | 523 μS |
| Fourth power supply circuit 20 | 40.2 KΩ | 0.1 μF | 701 μS |

In the table KΩ stands for kilohm, μF stands for microfarad, and μS stands for microsecond.

In detail, when the computer motherboard 100 is turned on, the +5V and +12V voltage output terminals provide +5V and +12V voltages respectively. The FET Q1 of the first power supply circuit 20 is turned on after 147 μS based on the corresponding delay circuit, the FET Q1 of the second power supply circuit 20 is turned on after 349 μS based on the corresponding delay circuit, the FET Q1 of the third power supply circuit 20 is turned on after 523 μS based on the corresponding delay circuit, the FET Q1 of the fourth power supply circuit 20 is turned on after 701 μS based on the corresponding delay circuit. When the FET Q1 is turned on, the corresponding FETs Q2 and Q3 are turned on, which connects the +5V and +12V voltage output terminals to the +5VH_SATA0 and +12VH_SATA0 power pins of the corresponding SATA HDD interface 10 respectively, and then the corresponding SATA HDD 30 is activated. Because the delay times of the first to fourth power supply circuits 20 are all different, the SATA HDDs 30 connected to the first to fourth SATA HDD interfaces 10 are activated at different times, which prevents too much current being drawn from the computer motherboard 100 at one time. Furthermore, the power supply circuits 20 are very simple and cheap, which is cost effective.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer motherboard comprising:
   a plurality of peripheral device interfaces each comprising a first power pin and a second power pin;
   a first and a second voltage output terminals; and
   a plurality of power supply circuits corresponding to the plurality of peripheral device interfaces; each of the plurality of power supply circuits comprising:
      a delay circuit;
      a first electronic switch, the delay circuit controlling the first electronic switch to be turned on after a delay time, wherein the delay time of each of the plurality of power supply circuits are different from each other; and
      a second and a third electronic switches, wherein the second and third electronic switches are turned on in response to the first electronic switch being turned on, wherein the first voltage output terminal is connected to the first power pin through the second electronic switch, the second voltage output terminal is connected to the second power pin through the third electronic switch.

2. The computer motherboard of claim 1, wherein the delay circuit comprises a resistor and a capacitor, a first terminal of the resistor is connected to the first voltage output terminal, a second terminal of the resistor is grounded through the capacitor, a node between the resistor and the capacitor is connected to the first electronic switch.

3. The computer motherboard of claim 2, wherein the first electronic switch is an n-channel metal oxide semiconductor field-effect transistor (NMOSFET), a gate of the first electronic switch is connected to the node between the resistor and the capacitor, a source of the first electronic switch is grounded, a drain of the first electronic switch is connected to the second and third switches.

4. The computer motherboard of claim 3, wherein the second electronic switch is a p-channel MOSFET (PMOSFET), a gate of the second electronic switch is connected to the drain of the first electronic switch, a source of the second electronic switch is connected to the second voltage output terminal, a drain of the second electronic switch is connected to the second power pin of the corresponding peripheral device interface.

5. The computer motherboard of claim 4, wherein, the third electronic switch is a PMOSFET, a gate of the third electronic switch is connected to the drain of the first electronic switch, a source of the third electronic switch is connected to the first voltage output terminal, a drain of the third electronic switch is connected to the first power pin of the corresponding peripheral device interface.

6. The computer motherboard of claim 1, wherein, the plurality of peripheral device interfaces is Serial Advanced Technology Attachment hard disk drive interfaces.

7. A power supply circuit for supplying power to a peripheral device interface of a computer motherboard, the peripheral device interface comprising a first power pin connected to a first voltage output terminal of the motherboard and a second power pin connected to a second voltage output terminal of the motherboard, the power supply circuit comprising:
   a delay circuit;
   a first electronic switch, the delay circuit controlling the first electronic switch to be turned on after a delay time; and
   a second and a third electronic switches, wherein the second and third electronic switches are turned on in response to the first electronic switch being turned on, wherein the first voltage output terminal of the motherboard is connected to the first power pin of the peripheral device interface through the second electronic switch, the second voltage output terminal of the motherboard is connected to the second power pin of the peripheral device interface through the third electronic switch.

8. The power supply circuit of claim 7, wherein the delay circuit comprises a resistor and a capacitor, a first terminal of the resistor is connected to the first voltage output terminal, a second terminal of the resistor is grounded through the capacitor, a node between the resistor and the capacitor is connected to the first electronic switch.

9. The power supply circuit of claim 8, wherein the first electronic switch is an n-channel metal oxide semiconductor field-effect transistor (NMOSFET), a gate of the first electronic switch is connected to the node between the resistor and the capacitor, a source of the first electronic switch is grounded, a drain of the first electronic switch is connected to the second and third switches.

10. The power supply circuit of claim 9, wherein the second electronic switch is a p-channel MOSFET (PMOSFET), a gate of the second electronic switch is connected to the drain of the first electronic switch, a source of the second electronic switch is connected to the second voltage output terminal, a drain of the second electronic switch is connected to the second power pin of the corresponding peripheral device interface.

11. The power supply circuit of claim 10, wherein the third electronic switch is a PMOS FET, a gate of the third electronic switch is connected to the drain of the first electronic switch, a source of the third electronic switch is connected to the first voltage output terminal, a drain of the third electronic switch is connected to the first power pin of the corresponding peripheral device interface.

12. The computer motherboard of claim 7, wherein, the plurality of peripheral device interfaces is Serial Advanced Technology Attachment hard disk drive interfaces.

* * * * *